United States Patent

Patzelt et al.

[11] Patent Number: 5,778,732
[45] Date of Patent: Jul. 14, 1998

[54] SAFETY ARRANGEMENT FOR MOTOR VEHICLE LEG ROOM

[75] Inventors: Helmut Patzelt, Kernen; Eberhard Klemm, Esslingen; Norbert Wessels, Stuttgart; Alfred Schnabel, Althengstett, all of Germany

[73] Assignee: Mercedes-Benz AG, Germany

[21] Appl. No.: 669,606

[22] Filed: Jun. 24, 1996

[30] Foreign Application Priority Data

Jun. 23, 1995 [DE] Germany ............. 195 22 398.5

[51] Int. Cl.⁶ .................................................. B62D 1/19
[52] U.S. Cl. ............................................ 74/512; 280/777
[58] Field of Search ............................ 74/560, 512, 513, 74/514, 492, 493; 280/777

[56] References Cited

U.S. PATENT DOCUMENTS

| | | | |
|---|---|---|---|
| 3,282,125 | 11/1966 | Dully | 74/512 X |
| 5,172,606 | 12/1992 | Dzioba et al. | 74/560 X |
| 5,259,646 | 11/1993 | Snyder | 280/777 |

FOREIGN PATENT DOCUMENTS

| | | |
|---|---|---|
| 0 029 757 A1 | 6/1981 | European Pat. Off. |
| 32 45 741 C2 | 6/1984 | Germany. |
| 39 04 616 A1 | 8/1989 | Germany. |
| 61-81851 | 4/1986 | Japan .................. 74/512 |
| 1-136872 | 5/1989 | Japan .................. 74/560 |
| 2052691 | 1/1981 | United Kingdom ......... 74/512 |

*Primary Examiner*—Charles A. Marmor
*Assistant Examiner*—Mary Ann Battista
*Attorney, Agent, or Firm*—Evenson, McKeown, Edwards & Lenahan, P.L.L.C.

[57] ABSTRACT

A safety arrangement in the leg room of a motor vehicle has a strut of a suspension for the tube of a safety steering column hanging down from a cross member into the leg room. A crash-caused bending of the strut is connected with a raising of the forward steering column tube end. A pedal assembly is arranged laterally next to the strut on a front wall of the vehicle body bounding the leg room in the front. In order to prevent an erection of the steering column tube caused by a shock impulse in the event of a crash of the motor vehicle with a rearward displacement of the pedal assembly, at least one laterally supporting deflecting device is arranged on the pedal assembly and/or on the strut, by way of which the pedal assembly is guided past the strut.

8 Claims, 5 Drawing Sheets

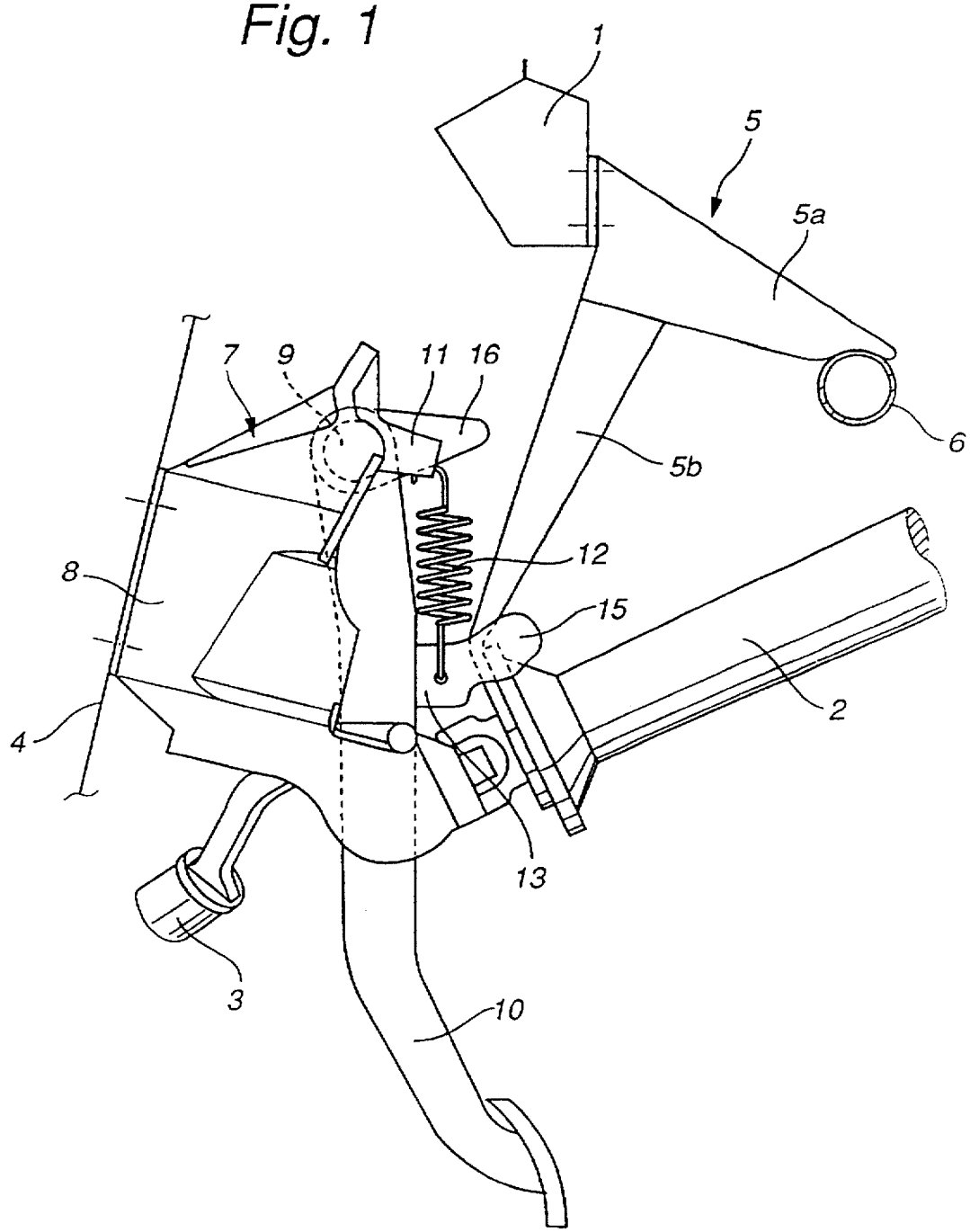

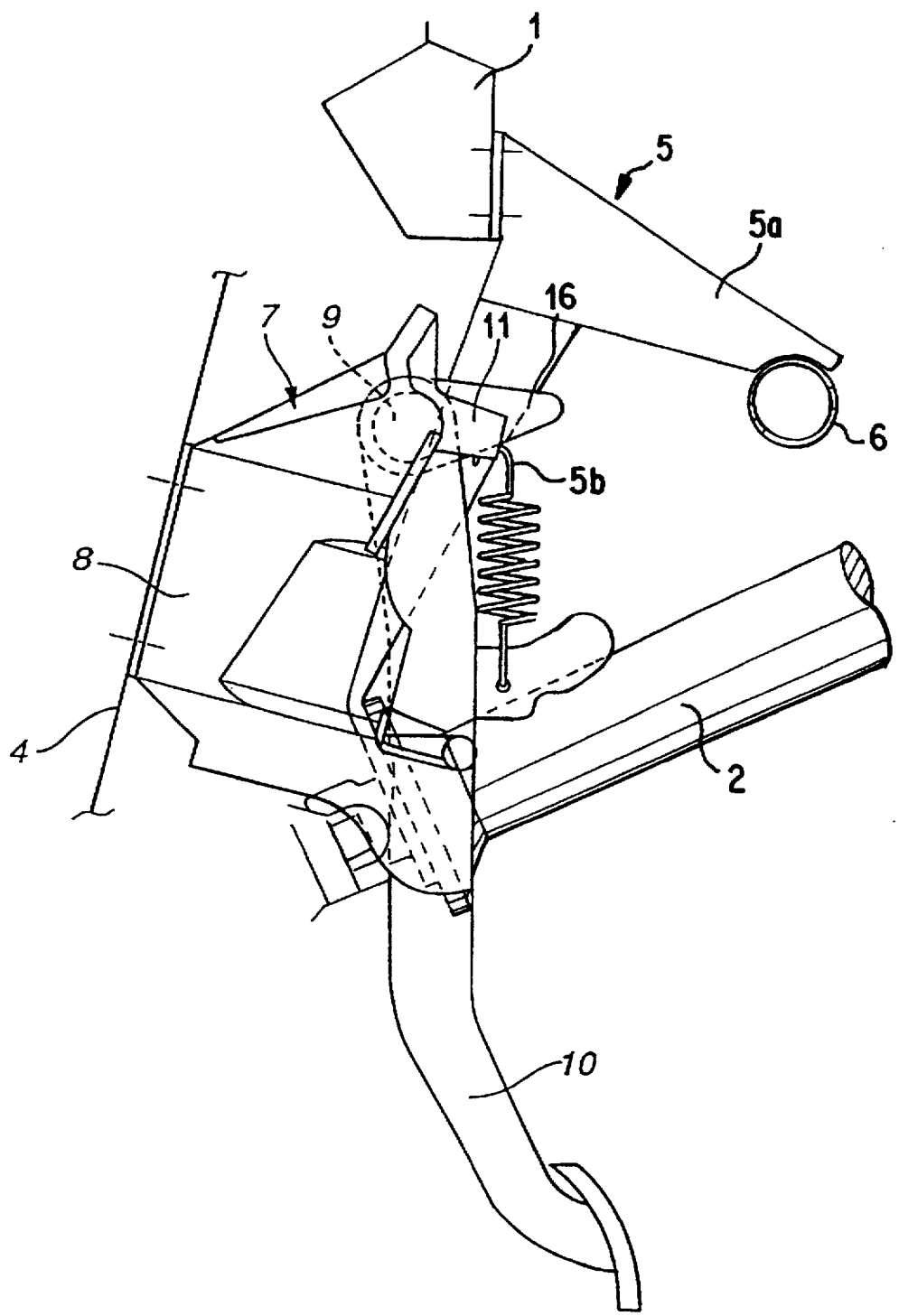

_5,778,732_

1

SAFETY ARRANGEMENT FOR MOTOR VEHICLE LEG ROOM

BACKGROUND AND SUMMARY OF THE INVENTION

The present invention relates to a safety arrangement in the leg room of a motor vehicle, and more particularly, to a safety arrangement in a leg room region of a motor vehicle comprising a strut of a suspension for a safety steering column tube hanging down into the leg room region and configured such that a crash-caused bending thereof is connected with a raising of an end of the forward steering column tube, a pedal assembly being arranged laterally next to the strut on a front wall of the motor vehicle to bound the front of the leg room.

DE 32 45 741 C2 shows a known safety arrangement for production vehicles whose steering column is suspended on a pair of struts. The forward strut of the steering column tube suspension has a considerable distance from the front wall of the leg room. For this reason, even in the event of an excessive collapsing of the front wall during a crash, a pedal assembly mounted on the front wall cannot easily collide with the forward strut of the suspension.

For constructional reasons, however, it may be necessary to arrange the forward strut of the suspension to slope slightly diagonally toward the front. This can result in a partial lateral covering of its lower length area with the pedal assembly. In addition, because of the diagonal position of the strut, the strut may have to be constructed to be slightly more resistant to bending for vibration-technical objectives.

Because of these constructional changes, more difficult crash conditions, for example, in the case of an offset crash at a higher speed against a deformable barrier, can result in an undesirable elastic erection movement of the steering column which lasts only for a short time. The erection movement is a result of the fact that the pedal assembly displaced rearwards, particularly by way of its laterally projecting axle area, because of the collapsing of the front wall, will be hung up or run up on the forward longitudinal side of the strut. Thereby, the strut is shock stressed. Before the strut buckles because of this shock effect, the shock impulse is converted into an erection movement of the steering column whereby the steering wheel is also displaced in a manner which is disadvantageous for the driver.

It is an object of the present invention to further improve the safety arrangement in the leg room of a motor vehicle such that, despite the above-mentioned constructive changes, and also under more difficult crash conditions, a short-term erection of the steering column can be reliably prevented.

This object has been achieved according to the present invention by providing that the pedal assembly extends at least with a portion of its length to a front of the strut and at least one laterally supporting deflecting device is arranged on at least one of the pedal assembly and on the strut of a crash-caused rearward displacement, for guiding the pedal assembly past the strut in the event of crash-caused rearward displacement.

BRIEF DESCRIPTION OF THE DRAWINGS

These and other objects, features and advantages of the present invention will become more readily apparent from the following detailed description thereof when taken in conjunction with the accompanying drawings wherein:

FIG. 1 is a side view of the safety arrangement view from the left;

2

Figure 2:
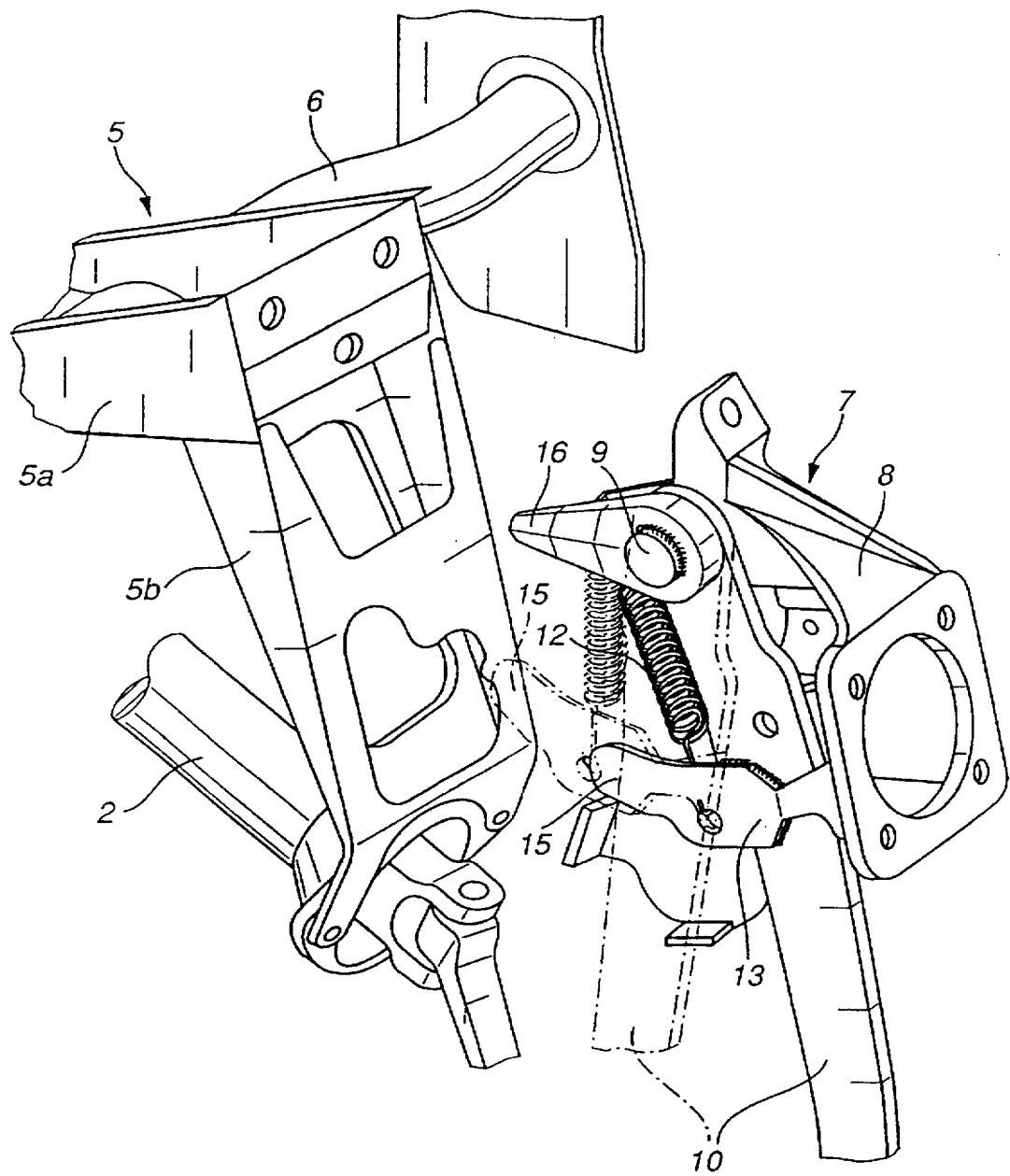
Figure 2A:
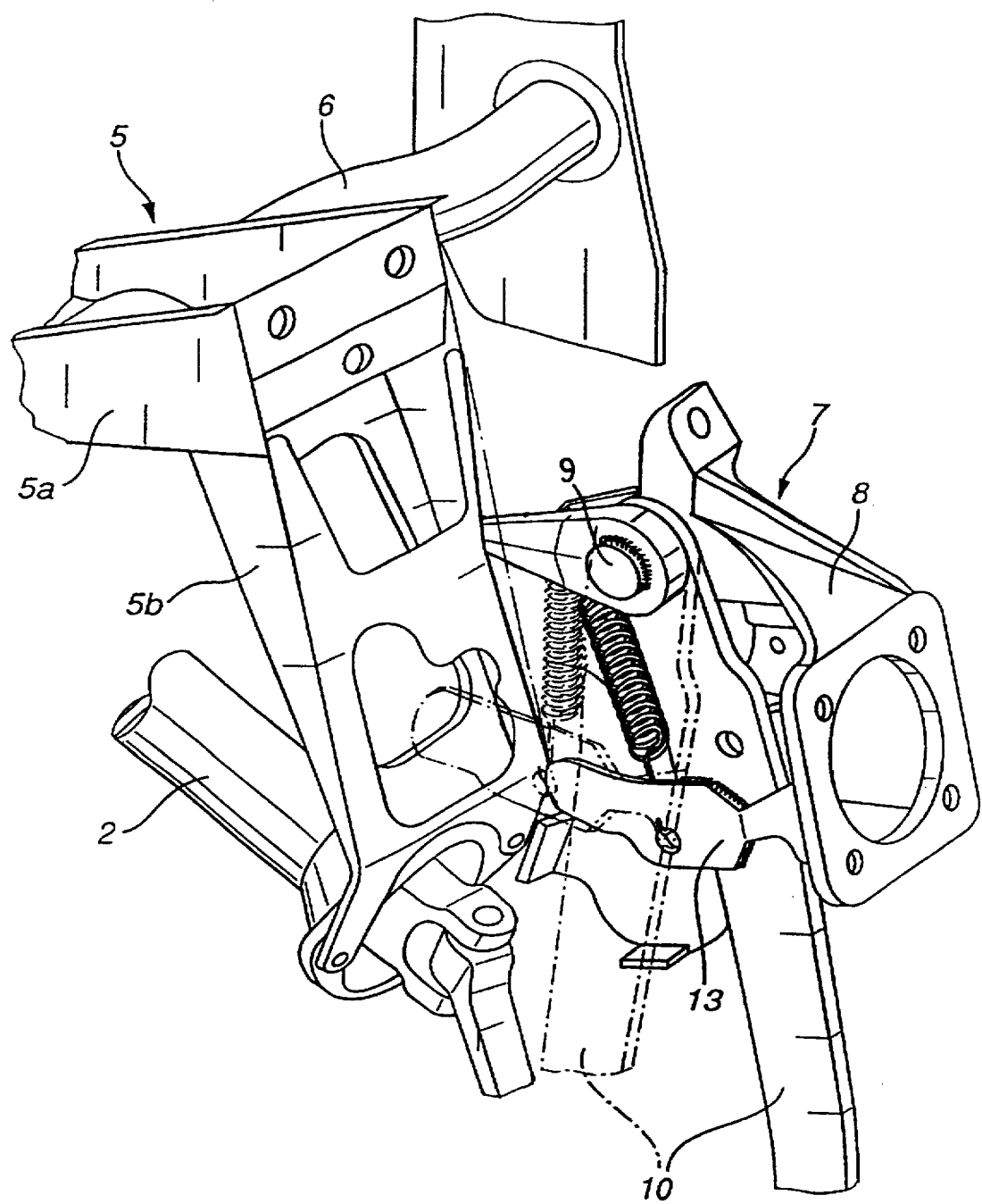
Figure 3:
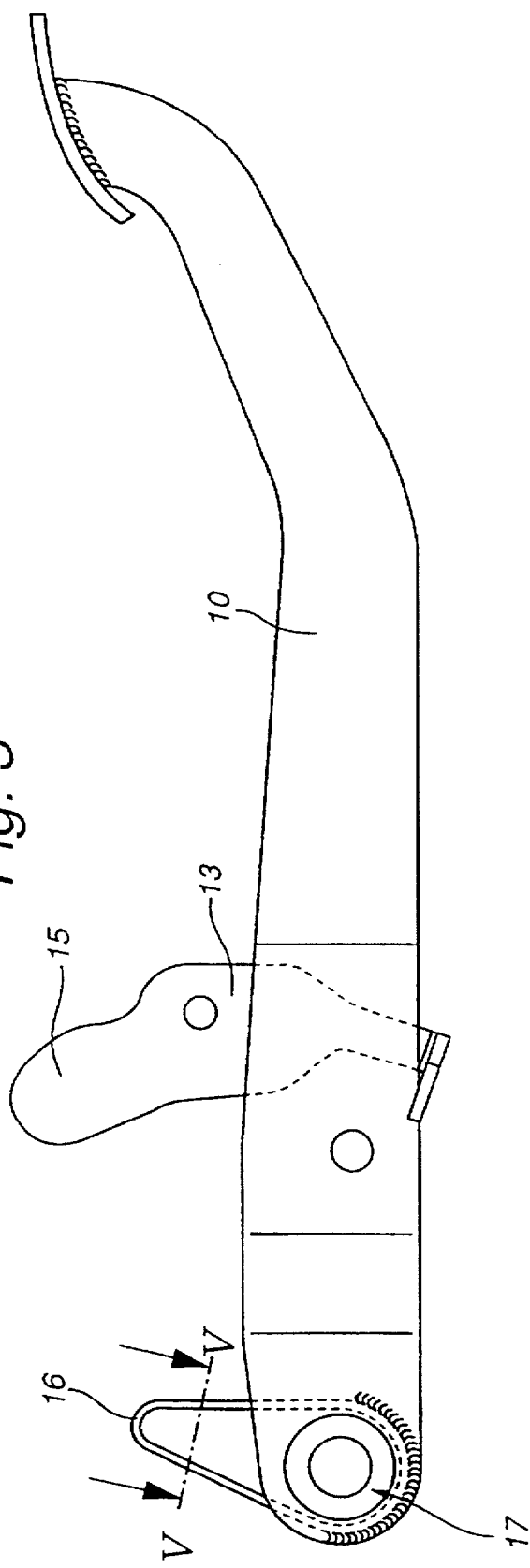
Figure 4:
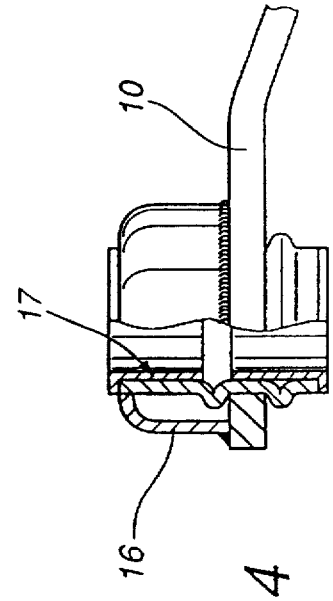

FIG. 1a is a view similar to FIG. 1 but showing the relative movement between the pedal assembly and the steering column tube;

FIG. 2 is a perspective view of the safety arrangement from the front;

FIG. 2a is a view similar to FIG. 2 but again showing the relative movement from a non-crash position to a crash-caused rearward displacement of the pedal assembly;

FIG. 3 is a side view of a pedal of the safety arrangement;

FIG. 4 is a partial cross-sectional view of a bearing end of the pedal; and

Figure 5:

FIG. 5 is a cross-sectional view along line V—V in FIG. 3.

DETAILED DESCRIPTION OF THE DRAWINGS

In FIG. 1, a cross member 1 of a motor vehicle body extends below the windshield (which need not shown for purposes of clarity) along the entire width of the vehicle interior. A suspension 5 for a steering column tube 2 is situated in front of the tube 2 of a safety steering column, whose steering spindle hinged to a corrugated tube 3 or the like is connected through an opening (not shown) in a forward front wall 4 of the vehicle body, with a steering gear.

The suspension 5 comprises a rear strut 5a and a forward strut 5b which are connected with one another to form an angularly rigid constructional unit. The forward end of the rearward strut 5a is stable; that is, it is fastened by screws or the like on the rear side of the cross member 1. Starting from the cross member 1, the strut 5a extends toward the rear of the vehicle interior, being sloped downward at an angle of approximately 20° with respect to a horizontal line. In its rearward end area, the strut 5a is supported by another cross member 6 on which it rests. This cross member 6 is, for example, a round tube which extends below the dashboard of the motor vehicle, (not shown) in its lateral sense and is fixed with its ends on the lateral body walls of the vehicle interior. The rearward strut 5a holds the steering column tube 2 in an invisible upper end area.

The strut 5b extends downward starting from the fastened forward end of the strut 5a and slopes diagonally toward the front at an angle of approximately 30° with respect to a vertical line. The strut 5b tapers increasingly in the downward direction until, in a lower end area, the wall thickness of its plate is reached. This end area is bent away perpendicularly with respect to the longitudinal axis of the steering column tube 2 and has a fork-shaped configuration. The annular face of a conically thickened base of the steering column tube 2 rests on this end area of the strut 5b, and in the contact area, the base is screwed to the end area of the strut 5b.

Both struts 5a, 5b are constructed as plate bending parts with an essentially U-shaped or rectangular cross-section which, because of their considerable wall thickness and cross-sectional width, form a stable and vibration-proof suspension 5 for the steering column tube 2.

Directly laterally next to the strut 5b, a pedal assembly 7 is arranged whose pedal bracket 8 is screwed on to be resting on the front wall 4 or the splash wall of the vehicle body. In its upper end area, the pedal bracket 8 carries a laterally projecting axle bolt 9 on which a brake pedal 10 is swivellably disposed by the upper end of its lever arm. Close to the axle bolt 9, a suspension abutment 11 projects toward the rear from the pedal bracket 8, in the suspension hole of the suspension abutment 11 an upper leg of a spiral tension spring 12 being suspended. At an adapted distance to the suspension abutment 11, a suspension abutment 13 made of sheet metal projects toward the rear away from the lever arm of the brake pedal 10. In a hole in the suspension abutment 13, a lower spring leg of the spiral tension spring 12 is suspended. Thus, the extended spiral tension spring 12 swivel loads the brake pedal 10 counterclockwise and, after the brake pedal 10 is released is always moved up into its starting position.

As illustrated in FIG. 1, when the brake pedal 10 is depressed, the pedal assembly 7 is situated almost completely in front of the strut 5b. When, in the event of a strong frontal crash, the front wall 4 of the vehicle body is collapsed, the pedal assembly 7 fastened on the front wall 4 is correspondingly displaced toward the rear, with this displacement taking place relative to the suspension 5. Because the pedal assembly 7 is situated at a small lateral distance next to the strut 5b, as illustrated in conjunction with FIG. 2, it can be hung up on the strut 5b, and the strut 5b can first bend through toward the rear in its lower longitudinal area. This would, for a short time, result in a lowering movement of the lower end area of the steering column tube 2 by way of which its upper end area would correspondingly be raised into a steep erected position. Because the steering wheel is also displaced, this would be connected with an increase of the risk of injury to the driver.

In order to ensure a buckling of the strut 5b in the center area without a resulting short-term tilting-up of the steering column tube 2 in the event of a crash as seen in solid lines in FIG 2a, deflecting devices are arranged on the pedal assembly 7 via which, the pedal assembly 7, in the case of its crash-caused rearward displacement, is guided past the strut 5b. The arrangement of the deflecting devices on the pedal assembly 7 presents fewer problems than its arrangement on the strut 5b, because the bending behavior of the strut 5b remains unchanged. In addition, an alignment of the deflecting devices can be implemented by the coupling of movements with the brake pedal 10, permitting a particularly compact arrangement of the deflecting devices.

A deflecting plate 15 is provided as the lower deflecting device and is integral with the plate of the suspension abutment 13 and, as its extension, projects in a tongue shape toward the rear. As a result, even when the brake pedal 10 is depressed, it is situated under a lateral covering with respect to the lower end area of the strut 5b so as to extend diagonally toward the opposite lateral wall of the strut 5b.

It is understood that the deflecting plate 15 consists of a sufficiently thick plate in order to be able to absorb the stress of a lateral support on the strut 5b. A weld seam on the broad side of the lever arm of the brake pedal 10 also fixedly connects the deflecting plate 15 with the brake pedal 10.

A deflecting lance 16 is provided as the upper deflecting device and encloses on its circumference the end area of the axle bolt 9 which projects to the strut side. As illustrated in connection with the individual representation of the brake pedal 10 according to FIG. 3 as well as the details according to FIGS. 4 and 5, the deflecting lance 16 consists of a deep-drawn half shell made of thick plate metal which, in an end area, as a ring sleeve, encloses the circumference of a hub arrangement 17 projecting laterally from the lever of the brake pedal 10 for the bearing on the axle bolt 9 and, on its circumference, is welded to the lever of the brake pedal 10. As a result, analogously to the deflecting plate 15, it is always moved together with the brake pedal 10. Starting out from this ring sleeve area, the deflecting lance 16 projects as a lancet-type hood approximately at a right angle with respect to the longitudinal course of the pedal lever toward the rear and increasingly tapers to a rounded point. In this projecting length area, it therefore has a wedge shape, having a sharp-edged elevation along its side facing the strut 5b.

Because of the above-described configuration, the deflecting lance 16, in the event of a crash-caused rearward displacement of the pedal assembly 7, interacts in a laterally upsetting manner with a desired bending zone of the strut 5b in its center area because its sharp-edged elevation increasingly cuts or digs into the lateral wall of the strut 5b in the sense of a lateral upsetting. This reduction of the bending resistance of the strut 5b therefore promotes in a targeted manner its buckling in the center area, as desired for the lowering of the safety steering column.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A safety arrangement in a leg room region of a motor vehicle, comprising a safety steering column tube having a suspension which includes a strut configured to extend down into the leg room region and having a targeted bending zone to effect a crash-caused bending thereof and a raising of a lower end of the steering column tube, and a pedal assembly arranged laterally next to the strut on a front wall of the motor vehicle to bound a front region of the leg room, wherein at least a portion of a length of the pedal assembly extends to a front portion of the strut and at least one laterally supporting deflecting device is arranged on at least one of the pedal assembly and on the strut such that, in the event of a crash-caused rearward displacement, the pedal assembly is caused to be guided past the strut by interaction of the at least one laterally supporting deflecting device with the targeted bending zone.

2. The safety arrangement according to claim 1, wherein the at least one deflecting device is a deflecting plate projecting from a side of a pedal of the pedal assembly adjacent the strut and laterally covering the strut.

3. The safety arrangement according to claim 2, wherein the deflecting plate extends diagonally toward a side of the strut.

4. The safety arrangement according to claim 2, wherein the deflecting plate is suspension abutment for a return spring of the pedal and, in a lower end area of the strut, projects from the pedal.

5. The safety arrangement according to claim 1, wherein the pedal assembly has, in a forward upper end area, an axle for a swivel bearing of a pedal which projects to a side of the strut, and, on the axle, the deflecting device constituting a sheet metal deflecting lance is arranged which, when the pedal assembly is displaced rearwardly as a result of a crash, runs up laterally on the strut in the targeted bending zone.

6. The safety arrangement according to claim 5, wherein the deflecting lance, in the event of a crash-caused rearward displacement of the pedal assembly, interacts with the targeted bending zone of the strut in a laterally upsetting manner.

7. The safety arrangement according to claim 5, wherein the deflecting lance is a covering hood which tapers in a wedge-shaped manner toward a point.

8. The safety arrangement according to claim 7, wherein an end area of the axle is enclosed at least largely annularly by the deflecting lance which is coupled with respect to movements with the pedal.

* * * * *